United States Patent [19]

Armenti et al.

[11] 4,165,302

[45] Aug. 21, 1979

[54] FILLED RESIN COMPOSITIONS CONTAINING ATACTIC POLYPROPYLENE

[75] Inventors: Carmen F. Armenti, Trenton, N.J.; James V. De Juneas, Lake Charles, La.

[73] Assignee: Cities Service Company, Tulsa, Okla.

[21] Appl. No.: 936,263

[22] Filed: Aug. 22, 1978

[51] Int. Cl.$^2$ .............................................. C08L 89/04
[52] U.S. Cl. .................................. 260/8; 260/17.4 R; 260/17.4 CL; 260/17.4 ST; 260/17.5; 260/42.46
[58] Field of Search ..................... 260/42.46, 8, 17.4 R

[56] References Cited

U.S. PATENT DOCUMENTS

| | | | |
|---|---|---|---|
| 3,745,142 | 7/1973 | Mahlman | 260/42.46 |
| 4,078,020 | 3/1978 | Rose et al. | 260/42.46 |
| 4,088,628 | 5/1978 | Bernstein et al. | 260/42.46 |
| 4,094,854 | 6/1978 | Harada et al. | 260/42.46 |
| 4,166,897 | 9/1978 | Huszar et al. | 260/42.46 |

FOREIGN PATENT DOCUMENTS 42-5871 3/1967 Japan .
927881 6/1963 United Kingdom .

*Primary Examiner*—Edward M. Woodberry
*Attorney, Agent, or Firm*—George L. Rushton

[57] ABSTRACT

Filled thermoplastic compositions have a lower melt index than do the virgin resins, leading to problems in molding. The melt index of the filled resin can be raised by the addition of 3–12 wt.% atactic polypropylene.

5 Claims, No Drawings

FILLED RESIN COMPOSITIONS CONTAINING ATACTIC POLYPROPYLENE

BACKGROUND OF THE INVENTION

This invention relates to resin compositions. More particularly, it relates to filled resin compositions containing atactic polypropylene.

Filled resin compositions are well known in the resin industry. "Filling" resin with an organic or inorganic filler is an accepted method of "stretching" the available supply of a particular resin or of producing a resin composition at a lower cost per unit. Whittington's "Dictionary of Plastics" (Technomic Publishing Co., Stamford, CT., 1968) discusses fillers.

The preparation of a mixture of isotactic and atactic polypropylenes is disclosed in U.S. Pat. No. 3,640,921. Other U.S. patents, such as U.S. Pat. Nos. 2,927,047; 2,956,042; 3,220,966; 3,261,889; 3,370,106; and 3,375,303 are typical of the prior art concerning the use of atactic polypropylene with other resins.

Filling a resin, such as low density polyethylene, with a filler, such as limestone or calcium carbonate, results in a composition that typically has a melt index lower than the melt index of the virgin resin. Thus, even though filled resins may have certain economic advantages, one of the main disadvantages arises during the extrusion of these resins. The melt index of the filled resin is lower than that of the virgin resin, the amount of lowering depending on the percentage of filler in the finished resin composition. Materials with a lowered melt index require special attention during extrusion. One method of raising the melt index of such a finished filled resin is to raise the extruder temperature, but this can result in thermal decomposition or some associated degradation, of the resin, thus giving an inferior product.

SUMMARY OF THE INVENTION

Our invention overcomes this major disadvantage, in that the composition that we claim has a melt index almost equal to that of the virgin resin used.

Our filled thermoplastic resin composition contains atactic polypropylene and comprises (a) a major amount of a filled resin comprising
(1) a basic resin selected from the group consisting of polyethylene, polypropylene, polystyrene, polybutylene, copolymers of vinyl acetate and ethylene, and acrylic resins, and
(2) a filler selected from the group consisting of organic fillers and inorganic fillers, and,
(b) a minor amount of atactic polypropylene.

DETAILED DESCRIPTION OF THE INVENTION

The resins used as the bases for the filled compositions can be any of the typical thermoplastic resins. These thermoplastic resins include polyethylene, polypropylene (isotactic), polybutylene, polystyrene, vinyl acetate-ethylene copolymers, and acrylic resins. In the finished composition, these resins may contain such additives as coloring pigments, antioxidants, mold release agents, etc., but, typically, the total amount of such additives is usually small enough so that the melt index of the resultant composition is not greatly different from that of the virgin resin. However, as noted above, when a filler is added, depending on the percentage of filler in the finished composition, the melt index is lowered.

The fillers used in such compositions are organic and inorganic in nature. The chemical and physical properties of the various fillers are well known in the trade and need not be discussed here. Examples of organic fillers are wood flour, cellulose, lignin, keratin, soybean meal, cherry pit flour, starch and peanut shells. Examples of inorganic fillers are calcium carbonate (limestone), wollastonite, silica, gypsum, mica, fly ash, clay, and talc. The relative ratio of resin to filler, in a filled resin, can vary from about 19 to 1, meaning that the wt.% resin in a filled resin can vary from about 95 to about 50.

As mentioned above, atactic polypropylene can be prepared in various ways and separated from the isotactic form. The atactic form is amorphous and the isotactic is crystalline—the atactic polypropylene is the desired component for this invention. It is desirable that the atactic polypropylene used have at least 98 wt.% of the atactic form, with a maximum of 2 wt.% of the isotactic form present. A commercially-available grade of atactic polypropylene, such as Polytac, from Crowley Chemical Co., New York, New York, contains about 98% atactic form.

To improve the melt index of a filled resin composition, we have found that the addition of from 3 to about 12 wt.% atactic polypropylene, based on the total wt. of the finished filled composition (and excluding the above-mentioned additives such as pigments, antioxidants, etc.) is the desired range. A preferred range is from about 5 to about 10 wt.%. The exact percentage to be added to the filled composition depends on the loading of the filler in the filled resin composition, the type of filler used, and the improvement in melt index desired. If not enough atactic polypropylene is added, the melt index of the filled composition shows only a slight improvement. On the other hand, if too much atactic polypropylene is added, the resultant composition becomes tacky, with the resultant disadvantages attached thereto.

Various procedures can be used in preparing the finished resin composition of the invention. For example, the filler, along with other additives, can be mixed with the virgin resin on a Banbury or a 2-roll mill, with the atactic polypropylene being mixed in a separate step. Or, the filler, the resin, and the atactic polypropylene can be mixed in one step. Such procedures are well known in the resin industry and need not be discussed here.

The examples below will show how the addition of atactic polypropylene to a filled resin composition improves the melt index of the composition.

EXAMPLE 1

| Ingredients (parts) | (a) | (b) | (c) | (d) | (e) |
|---|---|---|---|---|---|
| CaCO₃ (Camel Carb - H.T. Campbell & Sons Corp.) | — | 10 | 10 | 10 | 10 |
| Atactic Polypropylene (Polytac 500 - Crowley Chemical Co.) | — | — | 2 | 4 | 6 |
| Polyethylene (low density) - (EM 447 - Cities Service Co.) | 40 | 30 | 28 | 26 | 24 |
| Melt Index (STM-1238) | 20.5 | 14.8 | 21.6 | 29.9 | 50.2 |

In this example, the filled resin had a loading of 25% (based on the finished composition that was tested), and the wt.% of atactic PP added varied from 5 to 15 (based on the finished composition). The use of about 5 wt.% atactic PP restored the melt index of the filled composition to approximately that of the virgin resin. The use of 15 wt.% atactic PP not only resulted in a high MI but also gave a tacky composition.

EXAMPLE 2

| Ingredient (parts) | (a) | (b9 | (c) | (d) |
|---|---|---|---|---|
| CaCO₃ (Camel Carb) | — | 20 | 20 | 20 |
| Atactic PP (Polytac 500) | — | — | 2 | 4 |
| PE (low density) (EM 447) | 40 | 20 | 18 | 16 |
| Melt index | 20.5 | 8.2 | 14.1 | 21.4 |

In this example, the loading was 50 wt.%, and the addition of 10 wt.% of atactic PP to the filled composition gave a melt index close to that of the virgin resin.

EXAMPLE 3

| Ingredient (parts) | (a) | (c) | (c) | (d) | (e) |
|---|---|---|---|---|---|
| Clay ("Dixie" clay - hard kaolin - R.T. Vanderbilt Co.) | | 10 | 10 | 10 | 10 |
| Atactic PP (Polytac 500) | — | — | 2 | 4 | 6 |
| PE (low density) (EM 447) | 40 | 30 | 28 | 26 | 24 |
| Melt Index | 20.5 | 11.4 | 15.4 | 27.6 | 35.1 |

Here, at a 25 wt.% loading of clay, the addition of 5 wt.% atactic PP almost restored the melt index of the filled resin to the value of the virgin resin, while the addition of 10 wt.% atactic PP gave a filled composition with a larger melt index value.

Additional tests, using polybutylene, PVA copolymers, and methyl methacrylate, with cellulose, gypsum, and fly ash as fillers, and using 5 and 10 wt.% atactic polypropylene, give similar restoration of melt index to that of the virgin resin.

While the present invention has been described with reference to particular embodiments, it will be appreciated by those skilled in the art that various changes and modifications can be made without departing from the scope of the invention as set forth.

We claim:

1. A method of improving the melt index of a filled thermoplastic resin composition, said composition comprising (a) a basic resin selected from the group consisting of polyethylene, polypropylene (isotactic), polybutylene, copolymers of vinyl acetate and ethylene, polystyrene, and acrylic resins, and (b) a filler consisting from the group consisting of inorganic fillers and organic fillers, comprising adding a minor amount, based on the total finished composition, of atactic polypropylene.

2. The method of claim 1, wherein
   (a) the amount of filled resin varies from about 88 to about 97 wt.% and (b) the amount of atactic polypropylene varies from about 3 to about 12 wt.%.

3. The method of claim 1, wherein the filled resin comprises about 50 to 95 wt.% resin and about 5 to 50 wt.% filler.

4. The method of claim 1, wherein
   (a) the organic filler is selected from group consisting of wood flour, peanut shells, cellulose, lignin, keratin, soy bean meal, cherry pit flour, and starch,
   (b) the inorganic filler is selected from the group consisting of calcium carbonate, clay, talc, wollastonite, silica, gypsum, mica, and fly ash,
   (c) the amount of filled resin is from 90–95 wt.%, and
   (d) the amount of atactic polypropylene is from 5 to 10 wt.%, based on the total finished resin composition.

5. The method of claim 1, wherein the atactic polypropylene is about 98 wt.% atactic in structure.

* * * * *